United States Patent [19]

Murakami et al.

[11] 4,195,335

[45] Mar. 25, 1980

[54] SWITCHING POWER SUPPLY HAVING A WIDE RANGE INPUT CAPABILITY

[75] Inventors: David Murakami, Federal Way; Donald J. Sommer, Seattle, both of Wash.

[73] Assignee: The Boeing Company, Seattle, Wash.

[21] Appl. No.: 926,455

[22] Filed: Jul. 20, 1978

[51] Int. Cl.² .......................................... H02P 13/16
[52] U.S. Cl. .............................. 363/49; 323/DIG. 1
[58] Field of Search ............. 323/17, DIG. 1; 363/49

[56] References Cited

U.S. PATENT DOCUMENTS

| 3,349,311 | 10/1967 | Dudley | 363/49 X |
| 4,130,862 | 12/1978 | Holt | 363/49 |

Primary Examiner—A. D. Pellinen
Attorney, Agent, or Firm—Cole, Jensen & Puntigam

[57] ABSTRACT

A switching regulator type power supply, including a series switching element which, when energized, provides a voltage signal to an averaging filter, the output of which is applied to follow-on inverter and filtering circuits to produce a desired output voltage. In the startup mode of the supply, the switching element is energized by a circuit portion functioning as a blocking oscillator. The control action of the blocking oscillator results in a series of incremental increases in the voltage output of the averaging filter, thus avoiding large startup currents. When the output of the averaging filter reaches a predetermined first level, an error amplifier circuit is initiated, which forces the circuit portion to function as a constant current switched amplifier. The switching regulation of the error amplifier also results in a series of incremental increases in the output of the averaging filter, until a steady-state output is reached, at which point the switching element is controlled by normal regulation action.

14 Claims, 3 Drawing Figures

SWITCHING POWER SUPPLY HAVING A WIDE RANGE INPUT CAPABILITY

The Government has rights in this invention pursuant to contract No. N00123-76-C-0538 awarded by the U.S. Navy.

BACKGROUND OF THE INVENTION

The present invention relates generally to the art of power supplies, and more particularly concerns switching regulator type power supplies.

Size restrictions, if any, on a given power supply usually control whether the power supply uses a transformer or a switching regulator to produce the desired output. The smaller size supplies will use a switching regulator while a transformer is generally utilized where size and weight restrictions are not severe. Unfortunately, the switching regulator power supply is usually limited in its voltage and current capabilities, due to the operating limits of the switching transistor. This is especially true if a short switching time is required, which is usually the case where supply efficiency is an important consideration. Large transient startup currents are of particular concern in such power supplys and must be carefully dissipated. In some applications, startup can be implemented by an auxiliary power supply, but such a solution is not practical where size and operating efficiency are high design priorities.

Accordingly, it is a general object of the present invention to provide a switching regulator power supply which overcomes one or more of the disadvantages of the prior art discussed above.

It is an additional object of the present invention to provide such a power supply which is capable of operating on both AC and DC input voltages.

It is another object of the present invention to provide such a power supply which operates at a relatively high efficiency over a wide range of input voltages, both AC and DC.

It is a further object of the present invention to provide such a power supply which requires a minimum amount of space.

It is another object of the present invention to provide such a power supply having a relatively high current capability combined with fast switching characteristics, without an auxiliary power supply.

SUMMARY OF THE INVENTION

Accordingly, the present invention is a switching regulator type power supply which in operation advances from a startup mode, which is initiated upon turn-on of the device, to a steady state mode. The apparatus includes input means for receiving an input voltage which drives the supply and switching and filtering means which, when energized, provides an intermediate voltage signal. The supply further includes circuit means for energizing the switching and filtering means, with the circuit means including a circuit portion which is operative to function as a blocking oscillator during an initial portion of the time that the power supply is operating in its startup mode, and as a constant current switched amplifier thereafter, including during the time that the power supply is operating in its steady state mode. The supply also includes output means which is responsive to the intermediate voltage signal for providing a supply output voltage.

DESCRIPTION OF THE DRAWINGS

A more thorough understanding of the invention may be obtained by a study of the following description taken in connection with the accompanying drawings in which.

DESCRIPTION OF PREFERRED EMBODIMENT

The present invention is a switching regulator DC power supply. The invention is capable of accommodating both AC and DC voltage inputs, and relatively wide ranges of both voltage and frequency. The power supply operates in two modes, a startup mode, which includes several phases, when the supply is first energized, and a steady state mode, during which the supply is providing the desired output.

Figure 1:
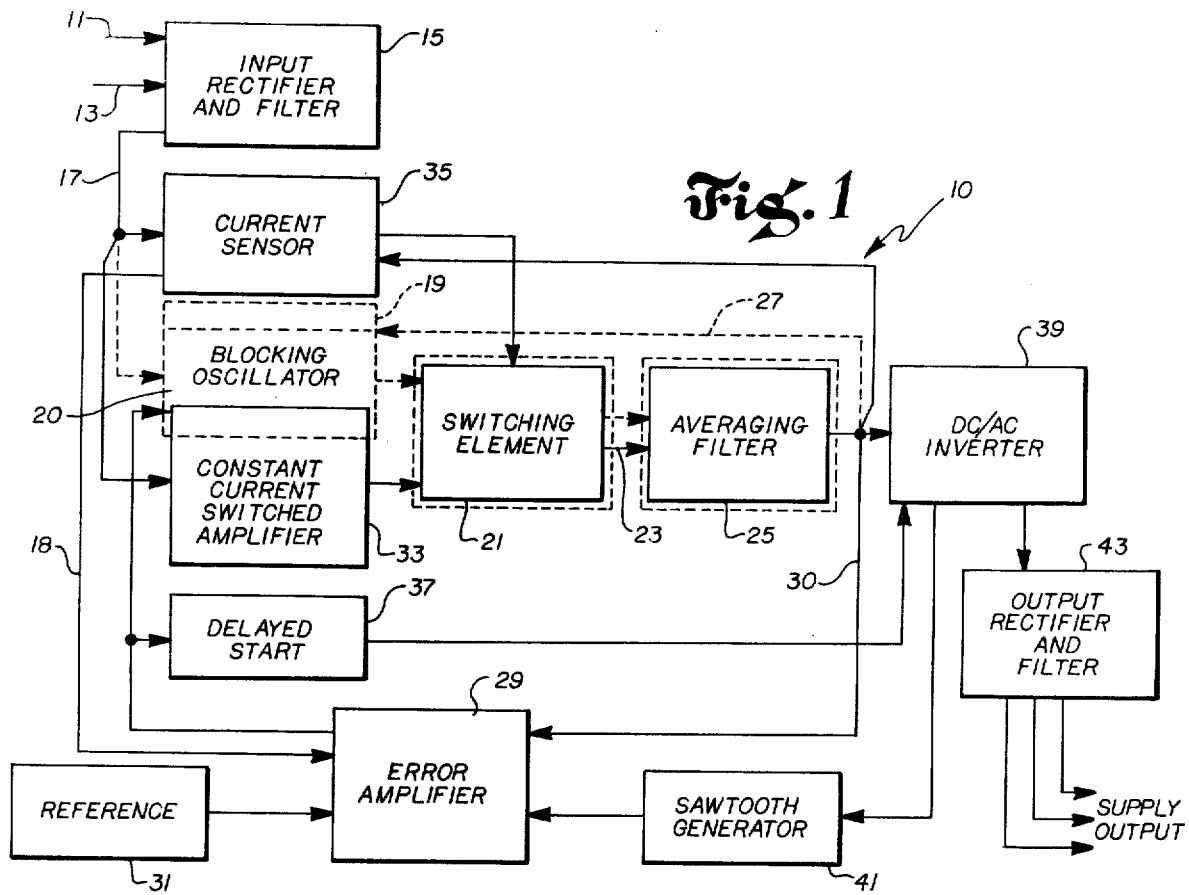
FIG. 1 is a block diagram of the circuit of the present invention.

The structure of the power supply, both in its startup and steady state modes, is shown in a generalized form in the block diagram of FIG. 1. The startup mode circuitry in its early phases, and signal flow therefor, is shown in dotted lines, while the later phases of the startup mode and the steady state mode circuitry is shown in solid lines. Some of the circuit blocks are shown both in solid lines and dotted lines, which indicates that they are utilized in both operating modes. One circuit, which will be explained in more detail hereinafter, changes operating characteristics after the initial phases of the startup mode. When the supply is in the initial part of its startup mode, the one circuit functions as a blocking oscillator, while thereafter, including the steady state mode, the one circuit functions as a constant current switched amplifier. Such an arrangement solves the large startup current problem, as will be clarified hereinafter, and permits the use of a smaller, faster transistor as the switching element, with its resulting high efficiency, without correspondingly sacrificing output voltage and current capability.

Referring now to FIG. 1, the input signal to the power supply, which is shown generally at 10, is applied on lines 11 and 13 to an input filter and rectifier circuit 15, which produces a DC output voltage on line 17. The input signal on lines 11 and 13 may be either AC or DC. The particular circuit arrangement of the present invention can accommodate a 21–179 VDC input or a 20–126 VAC input over a 50–400 Hertz frequency range.

In the initial phases of the startup mode of the supply, the primary signal path will be from circuit block 15 on line 17 to a circuit block 19 which includes, as a major portion, a circuit portion 20. Circuit portion 20, in the initial phases of the startup mode of the supply, functions as a blocking oscillator. The blocking oscillator selectively energizes a switching element 21, in a manner described hereinafter, with the output from the switching element 21, on line 23, being applied to an averaging filter 25. The output of the filter 25, referred to as an intermediate voltage signal, is then applied back on line 27 to the blocking oscillator.

In operation, the intermediate voltage signal from filter 25 continues to rise on successive blocking oscillator cycles, until it reaches a first predetermined level relative to the desired output voltage.

At this point, the supply changes from the initial phases of its startup mode to an intermediate phase. The first predetermined level of output from averaging filter 25 is high enough to activate error amplifier 29. This point is determined by a comparator in error amplifier 29 which compares a voltage derived from the voltage on line 30, i.e. the intermediate voltage signal, against a reference voltage produced by reference circuit 31. When the voltage derived from the voltage on line 30 reaches the value of the reference voltage, a pulse width modulator circuit in error amplifier 29 takes over control of the energization of switching element 21. The output of circuit 29 is then applied to circuit portion 20 which forces circuit portion 20 into operating as a constant current switched amplifier, shown as circuit 33 in FIG. 1. The output of circuit 33 drives switching element 21.

During this intermediate phase of the startup mode, the current output from averaging filter 25 is monitored by current sensor 35. The operation of error amplifier 29 is regularly interrupted by the current sensor over line 18 to prevent current overloading of the switching element 21, and hence, the voltage output of filter 25 continues to rise cyclically.

The intermediate voltage signal from filter 25 then reaches a second predetermined level, which is sufficient to activate a delayed start circuit 37, the output of which in turn is used to initiate a DC/AC inverter 39, a sawtooth generator 41, and output rectifier and filter circuit 43, from which the DC output of the supply is obtained.

The current sensor 35 continues to operate, maintaining the switching energization of element 21, until the steady state mode of the supply is reached. At this point, circuit 29 is providing a normal pulse width modulating output, and current sensor 35 is inactive. Steady state regulating action continues as long as the power supply is on. Various voltage outputs from circuit 43 may be achieved, depending upon the particular filter configuration.

Figure 2:
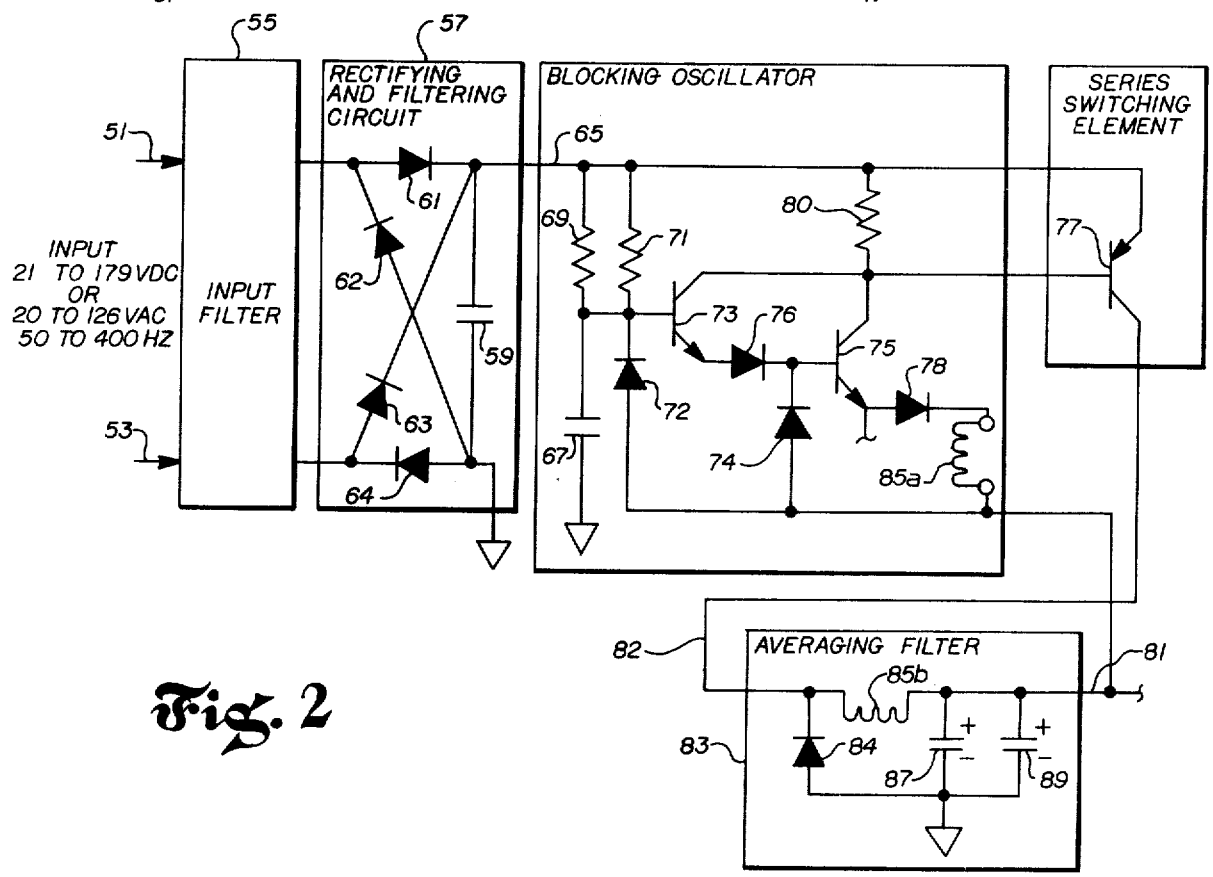
FIG. 2 is a schematic diagram showing in detail the operating portion of the circuit of FIG. 1 when it is in the initial portion of its startup mode.

Referring now to FIG. 2, a schematic diagram of the early phases of the startup mode circuitry is shown. The input signal is applied on input lines 51 and 53, which compare to lines 11 and 13 in FIG. 1, to a conventional input filter 55 and then to a full wave bridge rectifying and filtering circuit, shown generally at 57. The output of circuit 57 is thus a DC voltage, whether the input is AC or DC. The input signal will initially begin to charge capacitor 59 through diodes 61–64. Diodes 61–64 are in use when the input is AC, and diodes 61 and 64 are in use when the input is DC. The input voltage to the series switching element 77 begins to rise, and the voltage on line 65 will begin to charge capacitor 67 through resistances 69 and 71.

The voltage on capacitor 67 will increase until it exceeds the base-emitter threshold voltages of transistors 73 and 75, and the forward threshold voltages of diodes 76 and 78. A current path through secondary winding 85a of transformer 85 is created, which increases the voltage on line 81. Transistors 73 and 75 are operating at this point as a compound emitter-follower.

This action continues until the combined collector current of transistors 73 and 75 is sufficient to turn on transistor 77. At this point, the blocking oscillator, comprising resistors 69, 71 and 80, capacitors 67, 87 and 89, windings 85a and 85b of transformer 85, diodes 76, 78 and 84 and transistors 73 and 75, overrides the emitter-follower action.

The current through primary winding 85b of transformer 85 at this point in the operation of the supply will be coupled to secondary winding 85a, resulting in a boost of current through transistors 73 and 75, insuring the saturation of transistor 77. The output current of transistor 77 will surge correspondingly, resulting in the voltage on capacitors 87 and 89, which could be combined into a single capacitor, to rise faster than the voltage rise on capacitor 67.

The output voltage of the averaging filter 83 soon rises to the point where the voltage on capacitor 67 is insufficient to support the forward conduction of the base-emitter junctions of transistors 73 and 75. This results in transistors 73 and 75 becoming reversed biased and turning off, thus terminating the base drive to transistor 77. Transistor 77 then shuts off.

When transistor 77 is off, the voltage on capacitor 67 continues to increase, until it is again large enough to turn on transistors 73 and 75, which in turn again turns on transistor 77, resulting in another pulse of current to averaging filter 83. The time constants in the circuit are adjusted so that the voltage on capacitors 87 and 89 maintain their level during the time that transistor 77 is off. Hence, the intermediate voltage signal at the output of averaging filter 83 rises in steps from 0 volts in accordance with the cyclical action of the blocking oscillator.

During the above portions of the startup time, which is very short, less than one second, there is no output from the supply itself, as the DC/AC inverter, the sawtooth generator have not yet been activated. The action of the blocking oscillator described above will continue until the output of averaging filter reaches a first predetermined level, which in the embodiment shown, is between 8 and 11 volts for a 16 volt DC output.

Figure 3:
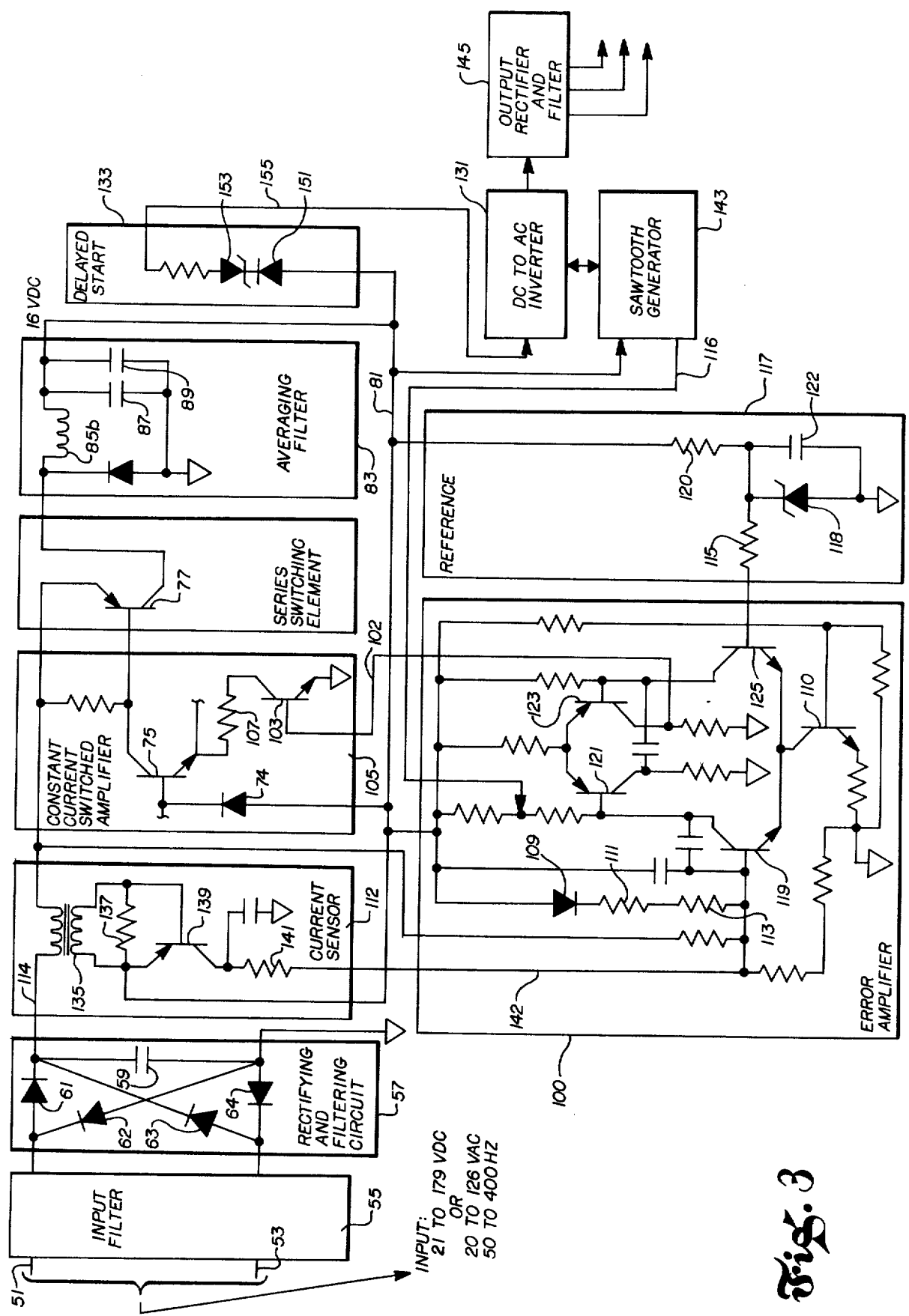
FIG. 3 is a combined schematic and block diagram showing in detail the operating portion of the circuit of FIG. 1 when it is in the later portions of its startup mode and in its steady state mode.

FIG. 3 shows the circuit of FIG. 1 after the supply has changed from the initial phases of the startup mode, i.e. after the intermediate voltage signal from filter 83 has reached the first predetermined level.

After turn-on of the supply, the intermediate voltage signal from averaging filter 83 on line 81 is applied to a reference circuit 117 and the error amplifier 100. When the voltage on line 81 reaches 8 volts in the embodiment shown, the error amplifier begins operation, as transistor 110 turns on.

At this point transistors 119 and 121 are on and transistors 123 and 125 are off. The reference zener diode 118 has a charging time constant determined by the values of resistor 120 and capacitor 122. The voltage present on line 81 is sampled through diode 109 and resistors 111 and 113. When the voltage at the base of transistor 125, which is approximately the voltage on the zener diode 118, goes higher than the voltage at the base of transistor 119, which is the voltage at the base of resistor 113, transistors 119 and 121 will turn off, and transistors 123 and 125 will turn on.

When transistor 123 turns on, a pulse of current is applied over line 102 to the base of transistor 103, turning it on, and causing it to saturate. When transistor 103 saturates, the emitter of transistor 75 is pulled toward ground through resistance 107, changing the operation of transistor 75 from its blocking oscillator mode into a common-based transistor mode, through diode 74. When transistor 75 is on, switching element 77 is also on, and the voltage at the output of averaging filter 25 is increasing. Transistor 73 is reversed biased through diodes 74 and 76.

The error amplifier 100 is controlled through a current sensing circuit 112. The transformer 135 in current sensing circuit 112 senses the large current surge on line 114 when transistor 103 is on. At a threshold current level established by resistor 137 and transistor 139, a signal is provided to error amplifier 100 through resistor 141 on line 142 to shut down error amplifier 100. The signal on line 142 turns transistor 119 back on, which results in transistor 121 turning on, and transistors 123 and 125 turning off, interrupting the base drive to transistor 103. This in turn interrupts the output of switching element 77.

At this point the sensing circuit monitoring the output of the averaging filter switches the circuitry back on, re-establishing the base drive to transistor 103. This period of switching, where the pulse width modulator of error amplifier 100 is free-running, continues, in the embodiment shown, until the output from the averaging filter reaches approximately 12 volts, the second predetermined level of the intermediate voltage signal.

At this point, the final stages of startup begin. The voltage on line 81 rises until it reaches the established breakdown voltage of zener diode 153 in the delayed start circuit 133. The output of delayed start circuit 133 on line 155, which occurs following zener breakdown, initiates operation of inverter 131. The output of the inverter then controls the sawtooth generator, which in turn applies a signal back to error amplifier 100 on line 116, which overrides the free-running operation of the error amplifier. The sawtooth generator, operating in the embodiment shown at 20 kilohertz, synchronizes the switching regulator with the inverter. In operation, the output voltage from averaging filter 83 continues to rise in discrete steps under the controlled switching action of the error amplifier 100 and the constant current switched amplifier 105.

When the intermediate voltage signal reaches 16 volts, the pulse width modulator in error amplifier 100 changes to normal pulse width modulated regulating action, and current sensing circuit 112 becomes inactive. The supply has now reached a steady state condition, in which the intermediate voltage signal from filter 83 activates circuits 131, 143, and 145 in a conventional, known manner to produce the desired supply output. The inverter 131, sawtooth generator 143 and rectifier and filter circuitry 145 are conventional elements and can be (1) purchased as off-the-shelf items and (2) connected conventionally as shown to provide the desired voltage outputs.

When the supply is in its steady state mode after the supply output has reached 16 volts, transistor 75 continues to operate in a common base mode, i.e. the base of transistor 75 is clamped to the output voltage level by diode 74, which has proven to increase the efficiency of the supply. Transistor 103 is operated in a saturated common-emitter amplifier mode, with its collector current being determined by resistor 107 and the difference between the emitter voltage of transistor 75 and the collector voltage of transistor 103. When transistors 75 and 103 are so operating, the circuit's efficiency is markedly increased, by as much as 20% over other known circuits.

Hence, a switching regulator type power supply has been disclosed which is capable of providing a specified voltage output at high efficiency over a wide range of DC and AC voltages and frequencies. The supply includes a circuit portion which operates as a blocking oscillator when the supply is in early stages of its startup mode and as a constant current switched amplifier thereafter. This arrangement permits a relatively small, fast transistor to be utilized as the switching element, with corresponding high efficiency, without degradation of output voltage and current levels.

Although an exemplary embodiment has been disclosed herein for purposes of illustration, it should be understood that various changes, modifications and substitutions may be incorporated in such embodiment without departing from the spirit of the invention, as defined by the claims which follow.

What is claimed is:

1. A switching regulator type power supply which advances operationally from a startup mode to a steady state mode, comprising:
   a. input means for receiving an input voltage;
   b. switching and filtering means providing an intermediate voltage signal when energized;
   c. circuit means for energizing said switching and filtering means, including a circuit portion operative to function as a blocking oscillator during an initial portion of the time that the power supply is operating in its startup mode, and as a constant current switched amplifier thereafter, including during the time that the power supply is operating in its steady state mode; and
   d. output means responsive to said intermediate voltage signal for providing a supply output voltage.

2. An apparatus of claim 1, wherein said circuit means includes means responsive to a first preselected level of the intermediate voltage signal to initiate operation of said circuit portion as a constant current switched amplifier.

3. An apparatus of claim 2, wherein said circuit means further includes pulse width modulator means which is free-running when the level of the intermediate voltage signal is between said first preselected level and a higher second preselected level, wherein said pulse width modulator means, when free-running, alternates between an active mode, in which it energizes said circuit portion as a constant current switched amplifier, and a quiescent mode, in which it does not energize said circuit portion, and wherein the apparatus further includes means for controlling the mode of said pulse width modulator means.

4. An apparatus of claim 3, wherein said mode controlling means includes current sensing means which is operative to change said pulse width modulator means to its quiescent mode when the current to the switching means reaches a predetermined level.

5. An apparatus of claim 4, wherein said circuit portion includes a first transistor which operates as an emitter-follower when said circuit portion functions as a blocking oscillator, and wherein said circuit means includes a second transistor, the operating state of which is controlled by said pulse width modulator means, which second transistor, when energized, pulls the emitter of said first transistor down so that it is in a common base mode of operation, so that said first portion of said circuit means functions as a constant current switched amplifier.

6. An apparatus of claim 5, wherein said initiating means includes a differential amplifier and a first zener diode reference circuit means for comparing said intermediate voltage signal with a reference voltage.

7. An apparatus of claim 6, including a delayed startup means for preventing energization of said output means until the intermediate voltage signal reaches said second preselected voltage level.

8. An apparatus of claim 7, wherein said delayed start-up means includes a second zener diode reference circuit and means applying the intermediate voltage signal to said second zener diode reference circuit.

9. An apparatus of claim 7, wherein said output means includes a DC to AC inverter and a sawtooth generator, which are activated by said delayed start-up means, said apparatus further including means applying the output of said sawtooth generator back to said circuit means to override the free-running state of said pulse width modulator means.

10. An apparatus of claim 9, wherein said input means includes means converting an AC voltage input, if any, to a DC voltage.

11. An apparatus of claim 10, including an averaging filter connected between said switching means and said output means, said intermediate voltage signal being taken from the output of said averaging filter.

12. An apparatus of claim 11, wherein said switching means is a transistor.

13. An apparatus of claim 12, wherein said output means includes rectifying and filtering means responsive to an output signal from said inverter to produce the supply output voltage.

14. An apparatus of claim 13, including means clamping the base of said first transistor to the intermediate voltage signal level when the desired level of said intermediate voltage signal has been reached.

* * * * *